United States Patent
Asano

(10) Patent No.: US 11,104,339 B2
(45) Date of Patent: Aug. 31, 2021

(54) DRIVING SUPPORT SYSTEM

(71) Applicant: TOYOTA JIDOSHA KABUSHIKI KAISHA, Toyota (JP)

(72) Inventor: Masayuki Asano, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 164 days.

(21) Appl. No.: 16/243,676

(22) Filed: Jan. 9, 2019

(65) Prior Publication Data
US 2019/0276025 A1 Sep. 12, 2019

(30) Foreign Application Priority Data

Mar. 8, 2018 (JP) .............................. JP2018-041862

(51) Int. Cl.
  *B60W 30/18* (2012.01)
  *B60W 10/04* (2006.01)
  *B60W 10/18* (2012.01)
(52) U.S. Cl.
  CPC ...... *B60W 30/18118* (2013.01); *B60W 10/04* (2013.01); *B60W 10/18* (2013.01); *B60W 2520/04* (2013.01); *B60W 2520/06* (2013.01); *B60W 2540/10* (2013.01)
(58) Field of Classification Search
  CPC ......... B60W 2540/10; B60W 2540/16; B60W 10/04; B60W 10/18; B60W 10/184; B60W 30/18118; B60W 2520/04; B60W 2520/06
  USPC ....................................................... 701/116
  See application file for complete search history.

(56) References Cited

U.S. PATENT DOCUMENTS

| 9,291,260 | B1* | 3/2016 | Fell | F16H 61/0213 |
| 2007/0096557 | A1* | 5/2007 | Tamai | B60T 7/122 303/191 |
| 2011/0065548 | A1* | 3/2011 | Yu | B60W 10/06 477/203 |
| 2012/0209479 | A1* | 8/2012 | Yanagida | B60T 7/122 701/51 |
| 2013/0082514 | A1* | 4/2013 | Murakami | B60T 8/4077 303/14 |
| 2014/0025267 | A1* | 1/2014 | Tezuka | B60W 30/18027 701/51 |

(Continued)

FOREIGN PATENT DOCUMENTS

| CN | 1935570 B * | 5/2010 | .......... B60L 15/2081 |
| EP | 3075616 A2 * | 10/2016 | .............. B60T 8/245 |

(Continued)

*Primary Examiner* — Atul Trivedi
(74) *Attorney, Agent, or Firm* — Sughrue Mion, PLLC

(57) ABSTRACT

A driving support system installed on a vehicle includes: a roll back detection device configured to detect roll back of the vehicle; a stop-state detection device configured to detect stopping of the vehicle; a driving operation detection device configured to detect a driving operation performed by a driver of the vehicle; and a driving support control device configured to execute driving support control. The driving support control includes roll back suppression control that generates at least one of a driving force and a braking force to stop the vehicle when the roll back is detected. The driving support control device continues the roll back suppression control at least until the vehicle stops, even when the driving operation is performed during execution of the roll back suppression control.

9 Claims, 10 Drawing Sheets

(56) References Cited

U.S. PATENT DOCUMENTS

| | | | |
|---|---|---|---|
| 2015/0203117 A1* | 7/2015 | Kelly | B60W 30/143 |
| | | | 701/91 |
| 2016/0159225 A1* | 6/2016 | Nakatsu | B60T 1/10 |
| | | | 701/71 |
| 2020/0198431 A1* | 6/2020 | Isshiki | B60G 17/0162 |

FOREIGN PATENT DOCUMENTS

| | | | | |
|---|---|---|---|---|
| JP | 2006-311644 A | | 11/2006 | |
| JP | 2015-202048 A | | 11/2015 | |
| JP | 5895368 B2 | * | 3/2016 | |
| JP | 2016107766 A | * | 6/2016 | ................ B60L 3/10 |
| WO | WO-2016189670 A1 | * | 12/2016 | .......... B60L 15/009 |

\* cited by examiner

DRIVING SUPPORT SYSTEM

BACKGROUND

Technical Field

The present disclosure relates to a driving support system installed on a vehicle. In particular, the present disclosure relates to a driving support system for suppressing roll back of a vehicle.

Background Art

There is a possibility that "roll back" occurs on a slope road and the like when a vehicle starts moving or immediately before the vehicle stops. The roll back is a vehicle movement that the vehicle moves in a direction opposite to a desired movement direction.

Patent Literature 1 discloses a driving control device that drives a wheel by using a motor. The driving control device has a roll back detection means for detecting roll back. When the roll back is detected, the driving control device executes driving control that generates a motor torque for suppressing the roll back. When an acceleration operation is performed by a driver, the driving control device terminates the driving control suppressing the roll back and generates a motor torque according to the acceleration operation.

LIST OF RELATED ART

Patent Literature 1: Japanese Unexamined Patent Application Publication No. 2006-311644

SUMMARY

According to the above technique disclosed in Patent Literature 1, when an acceleration operation is performed by the driver during execution of the driving control for suppressing the roll back, the driving control for suppressing the roll back is terminated. Then, the motor torque according to the acceleration operation is generated. However, if the motor torque according to the acceleration operation is insufficient, the vehicle does not stop and the roll back continues.

An object of the present disclosure is to provide a technique that can surely stop a vehicle when roll back of the vehicle occurs.

A first disclosure is directed to a driving support system installed on a vehicle.

The driving support system includes:

a roll back detection device configured to detect roll back of the vehicle;

a stop-state detection device configured to detect stopping of the vehicle;

a driving operation detection device configured to detect a driving operation performed by a driver of the vehicle; and a driving support control device configured to execute driving support control.

The driving support control includes roll back suppression control that generates at least one of a driving force and a braking force to stop the vehicle when the roll back is detected.

The driving support control device is configured to continue the roll back suppression control at least until the vehicle stops, even when the driving operation is performed during execution of the roll back suppression control.

A second disclosure further has the following feature in addition to the first disclosure.

The driving support control device is further configured to determine, based on a state of the driving operation, whether or not the driver has a stop-state maintaining intention of maintaining a stop state of the vehicle.

When determining that the driver has the stop-state maintaining intention after the vehicle stops by the roll back suppression control, the driving support control device terminates the roll back suppression control.

A third disclosure further has the following feature in addition to the first disclosure.

The driving support control device is further configured to determine, based on a state of the driving operation, whether or not the driver has a start moving intention of making the vehicle start moving.

When determining that the driver has the start moving intention after the vehicle stops by the roll back suppression control, the driving support control device terminates the roll back suppression control.

A fourth disclosure further has the following feature in addition to the first disclosure.

The driving support control further includes stop-state maintaining control that maintains a stop state of the vehicle.

When starting the stop-state maintaining control after the vehicle stops by the roll back suppression control, the driving support control device terminates the roll back suppression control.

A fifth disclosure further has the following feature in addition to the fourth disclosure.

The driving support control device is further configured to determine, based on a state of the driving operation, whether or not the driver has a stop-state maintaining intention of maintaining a stop state of the vehicle.

When determining that the driver has the stop-state maintaining intention after the stop-state maintaining control is started, the driving support control device terminates the stop-state maintaining control.

A sixth disclosure further has the following feature in addition to the fourth disclosure.

The driving support control device is further configured to determine, based on a state of the driving operation, whether or not the driver has a start moving intention of making the vehicle start moving.

When determining that the driver has the start moving intention after the stop-state maintaining control is started, the driving support control device terminates the stop-state maintaining control.

A seventh disclosure further has the following feature in addition to any one of the first to sixth disclosures.

The driving operation includes an acceleration operation.

The driving support control device refrains from generating a driver's request driving force according to the acceleration operation during the roll back suppression control.

According to the present disclosure, the driving support control device continues the roll back suppression control at least until the vehicle stops, even when the driving operation is performed by the driver during execution of the roll back suppression control. It is thus possible to surely stop the vehicle when the roll back occurs. As a result, a risk that the vehicle collides with a following vehicle is reduced.

EMBODIMENTS

Embodiments of the present disclosure will be described below with reference to the attached drawings.

I. Outline

Figure 1:
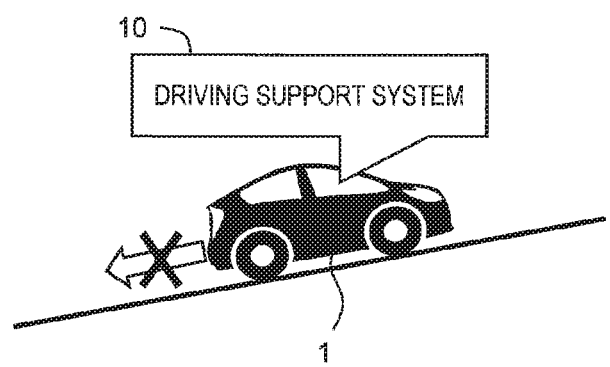
FIG. 1 is a conceptual diagram for explaining a driving support system according to an embodiment of the present disclosure.

FIG. 1 is a conceptual diagram for explaining a driving support system 10 according to the present embodiment. The driving support system 10 is installed on a vehicle 1 and executes "driving support control" that supports driving of the vehicle 1.

Here, let us consider "roll back suppression control" which is an example of the driving support control. The roll back suppression control is vehicle control for suppressing "roll back" where the vehicle 1 moves in a direction opposite to a desired movement direction. Typically, the roll back occurs on a slope road when the vehicle 1 starts moving or immediately before the vehicle 1 stops. When detecting the roll back of the vehicle 1, the driving support system 10 executes the roll back suppression control. More specifically, the driving support system 10 generates at least one of a driving force and a braking force such that the vehicle 1 stops.

Figure 2:
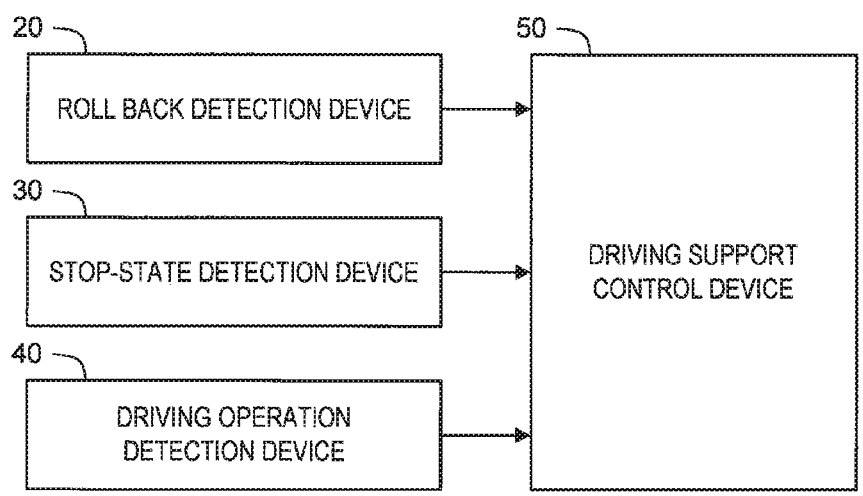
FIG. 2 is a block diagram schematically showing a configuration of the driving support system according to the embodiment of the present disclosure.

FIG. 2 is a block diagram schematically showing a configuration of the driving support system 10 according to the present embodiment. The driving support system 10 is provided with a roll back detection device 20, a stop-state detection device 30, a driving operation detection device 40, and a driving support control device 50. The roll back detection device 20 is configured to detect the roll back of the vehicle 1. The stop-state detection device 30 is configured to detect stopping of the vehicle 1. The driving operation detection device 40 is configured to detect a driving operation performed by a driver of the vehicle 1. The driving operation is exemplified by an acceleration operation and a braking operation.

The driving support control device 50 is configured to execute the driving support control. For example, when the roll back is detected by the roll back detection device 20, the driving support control device 50 executes the roll back suppression control. More specifically, the driving support control device 50 generates at least one of a driving force and a braking force to stop the vehicle 1. During execution of the roll back suppression control, the driving operation such as the acceleration operation and the braking operation may be detected by the driving operation detection device 40. Even in that case, the driving support control device 50 does not abort (deactivate) the roll back suppression control. The driving support control device 50 continues the roll back suppression control at least until the stopping of the vehicle 1 is detected by the stop-state detection device 30.

As described above, according to the present embodiment, the driving support control device 50 continues the roll back suppression control at least until the vehicle 1 stops, even when the driving operation is performed by the driver during execution of the roll back suppression control. It is thus possible to surely stop the vehicle 1 when the roll back occurs. As a result, a risk that the vehicle 1 collides with a following vehicle is reduced.

Hereinafter, the driving support system 10 according to the present embodiment will be described in more detail.

2. Configuration Example of Driving Support System 2-1. Overall Configuration

Figure 3:
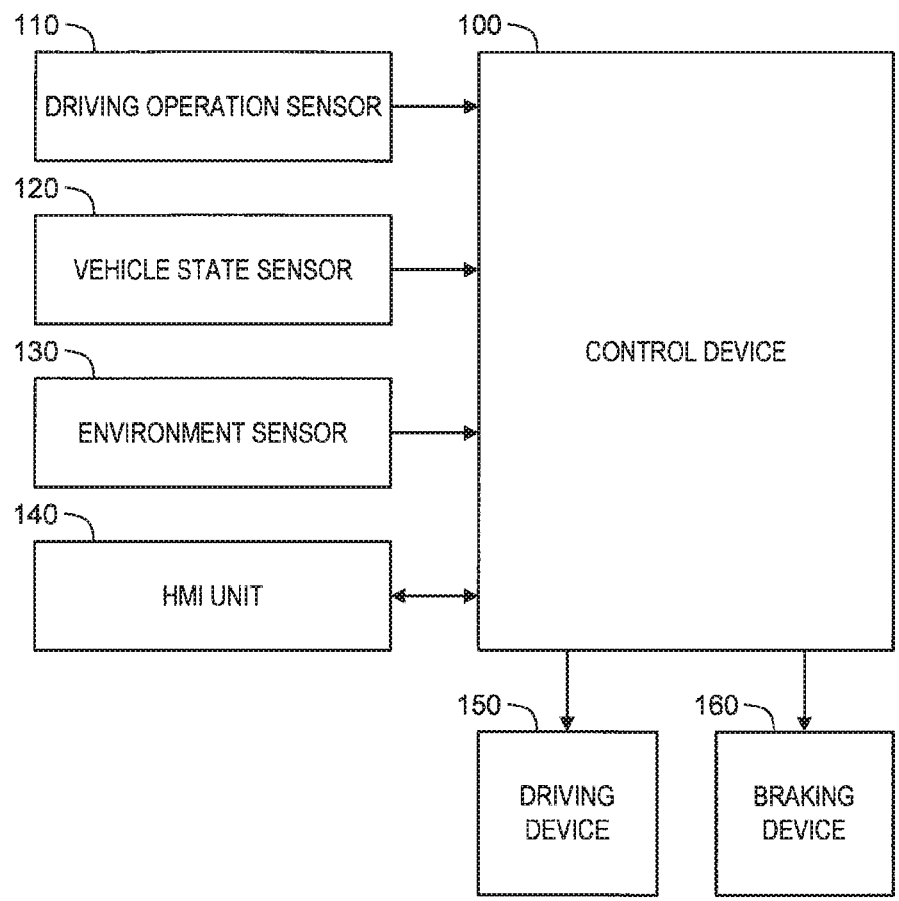
FIG. 3 is a block diagram showing a configuration example of the driving support system according to the embodiment of the present disclosure.

FIG. 3 is a block diagram showing a configuration example of the driving support system 10 according to the present embodiment. The driving support system 10 is provided with a control device 100, a driving operation sensor 110, a vehicle state sensor 120, an environment sensor 130, an HMI (Human Machine Interface) unit 140, a driving device 150, and a braking device 160.

The control device 100 (controller) executes a variety of control processing with regard to the vehicle 1. The control device 100 is a microcomputer including a processor and a memory device. The control device 100 is also called an ECU (Electronic Control Unit). The processing by the control device 100 is achieved by the processor executing a control program stored in the memory device. The processing by the control device 100 includes the driving support control according to the present embodiment.

The driving operation sensor 110 detects the driving operation performed by the driver of the vehicle 1. The driving operation includes an acceleration operation, a braking operation, and a shift lever operation. The braking operation includes an operation of a brake pedal and an operation of a parking brake lever. The driving operation sensor 110 includes an accelerator pedal sensor, a brake sensor, a parking brake sensor, a gear position sensor, and so forth. The accelerator pedal sensor detects a stroke amount of an accelerator pedal. The brake sensor detects a stroke amount of the brake pedal. The parking brake sensor detects the operation of the parking brake lever. The gear position sensor detects a position of a shift lever. The driving operation sensor 110 sends the detected information to the control device 100.

The vehicle state sensor 120 detects a state of the vehicle 1. For example, the vehicle state sensor 120 includes a wheel speed sensor, a vehicle speed sensor, and the like. The wheel speed sensor detects a rotating speed of each wheel of the vehicle 1. The vehicle speed sensor detects a speed of the vehicle 1. The vehicle state sensor 120 sends the detected information to the control device 100.

The environment sensor 130 detects driving environment for the vehicle 1. For example, the environment sensor 130 includes a GPS (Global Positioning System) device, a camera, a LIDAR (Laser Imaging Detection and Ranging), and so forth. The GPS device receives signals transmitted from a plurality of GPS satellites and calculates a position and an orientation of the vehicle 1 based on the received signals. The camera images a situation around the vehicle 1. The LIDAR detects a target around the vehicle 1. The environment sensor 130 sends the detected information to the control device 100.

The HMI unit 140 is an interface for providing the driver with information and receiving information from the driver. More specifically, the HMI unit 140 includes an input device and an output device. The input device is exemplified by a touch panel, a switch, a microphone, and the like. The output device is exemplified by a display device, a speaker, and the like. The driver can use the input device to turn ON/OFF driving support functions by the driving support system 10 according to the present embodiment.

The driving device 150 is a mechanism for generating the driving force. The driving device 150 is exemplified by an electric motor and an engine. The control device 100 generates a desired driving force by controlling an operation of the driving device 150.

The braking device 160 is a mechanism for generating the braking force. The braking device 160 includes a brake actuator and a wheel cylinder provided for each wheel. The control device 100 generates a desired braking force by controlling an operation of the braking device 160.

The braking device 160 further includes a parking brake. The driver can manually put the parking brake on by operating the parking brake lever. In addition, the control device 100 can automatically put the parking brake on.

2-2. Roll Back Detection Device 20

Figure 4:
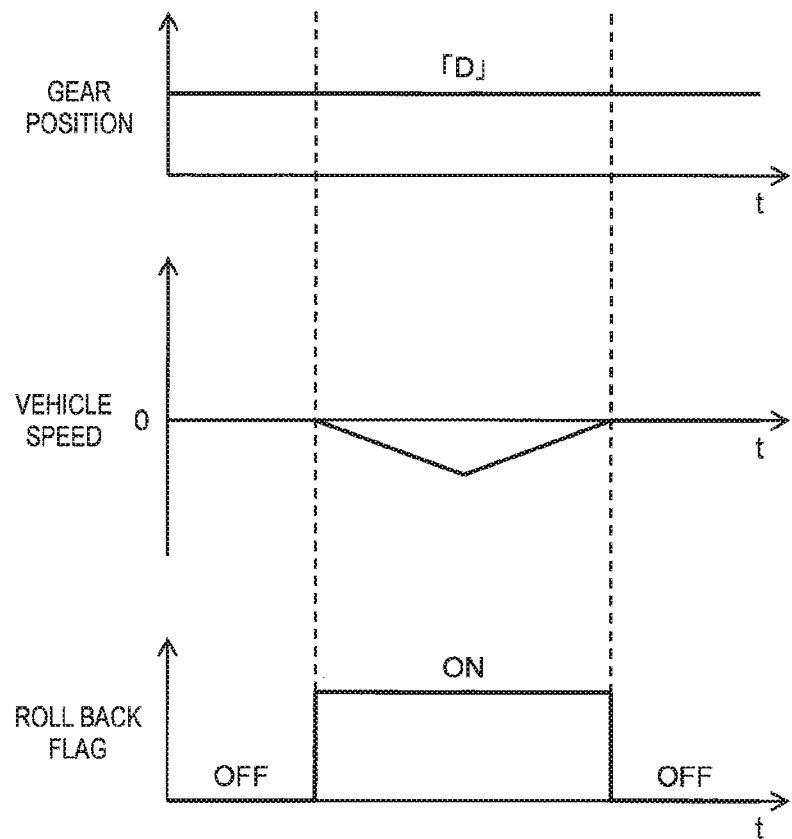
FIG. 4 is a timing chart for explaining an example of a roll back detection method in the embodiment of the present disclosure.

The control device 100 executes "roll back detection processing" that detects the roll back of the vehicle 1. For example, let us consider a timing chart shown in FIG. 4. A roll back flag in FIG. 4 is a flag indicating whether or not the roll back occurs. When the vehicle speed is negative although the gear position is "D (Drive)", that is, when the vehicle 1 is moving backward, the control device 100 determines that the roll back is occurring (roll back flag="ON"). Otherwise, the control device 100 determines that the roll back is not occurring (roll back flag="OFF").

The gear position is detected by the driving operation sensor 110 (specifically, the gear position sensor). The vehicle speed is detected by the vehicle state sensor 120 (specifically, the vehicle speed sensor). Alternatively, the vehicle speed may be calculated from the rotating speed of each wheel detected by the wheel speed sensor. As another example, a backward movement of the vehicle 1 may be detected based on measurement information obtained by the environment sensor 130. For instance, the backward movement of the vehicle 1 is detected based on position-orientation information obtained by the GPS device. Alternatively, the backward movement of the vehicle 1 is detected based on measurement information obtained by the camera or the LIDAR.

It can be said that the control device 100, the driving operation sensor 110, the vehicle state sensor 120, and the environment sensor 130 constitute the "roll back detection device 20" shown in FIG. 2.

2-3. Stop-State Detection Device 30

The control device 100 executes "stop-state detection processing" that detects stopping of the vehicle 1. The vehicle speed is detected by the vehicle state sensor 120 (specifically, the vehicle speed sensor). Alternatively, the vehicle speed may be calculated from the rotating speed of each wheel detected by the wheel speed sensor. It can be said that the control device 100 and the vehicle state sensor 120 constitute the "stop-state detection device 30" shown in FIG. 2.

2-4. Driving Operation Detection Device 40

The control device 100 executes "driving operation detection processing" that detects the driving operation performed by the driver of the vehicle 1. The driving operation includes the acceleration operation, the braking operation, the shift lever operation. The braking operation includes the operation of the brake pedal and the operation of the parking brake lever. The driving operation is detected by the driving operation sensor 110. It can be said that the control device 100 and the driving operation sensor 110 constitute the "driving operation detection device 40" shown in FIG. 2.

2-5. Driving Support Control Device 50

The control device 100 executes the driving support control. For example, the driving support control includes the roll back suppression control, stop-state maintaining control, autonomous driving control, ACC (Adaptive Cruise Control), and so forth.

The roll back suppression control is executed when the roll back is detected by the roll back detection device 20. In the roll back suppression control, the control device 100 generates at least one of the driving force and the braking force such that the vehicle 1 stops. A desired driving force is generated by controlling the operation of the driving device 150. A desired braking force is generated by controlling the operation of the braking device 160. Stopping of the vehicle 1 is detected by the stop-state detection device 30.

The driving force requested by the control device 100 for stopping the vehicle 1 in the roll back suppression control is hereinafter referred to as a "system's request driving force FD1". The control device 100 calculates the system's request driving force FD1 based on the vehicle speed and so forth. On the other hand, the driving force according to the acceleration operation by the driver, that is, the driving force according to an acceleration request from the driver is hereinafter referred to as a "driver's request driving force FD2". The acceleration operation by the driver is detected by the driving operation detection device 40. According to the present embodiment, the control device 100 generates only the system's request driving force FD1 and refrains from generating the driver's request driving force FD2, even if there is the acceleration request from the driver during execution of the roll back suppression control. That is, the control device 100 does not reflect the acceleration request from the driver in the driving force during execution of the roll back suppression control. It is thus possible to prevent the vehicle 1 from suddenly accelerating due to the driver's request driving force FD2.

The braking force requested by the control device 100 for stopping the vehicle 1 in the roll back suppression control is hereinafter referred to as a "system's request braking force FB1". The control device 100 calculates the system's request braking force FB1 based on the vehicle speed and so forth. On the other hand, the braking force according to the brake pedal operation by the driver, that is, the driving force according to the deceleration request from the driver is hereinafter referred to as a "driver's request braking force FB2". The brake pedal operation by the driver is detected by the driving operation detection device 40. According to the present embodiment, when there is the deceleration request from the driver during execution of the roll back suppression control, the control device 100 generates a sum of the system's request braking force FB1 and the driver's request braking force FB2 as the braking force. That is, the control device 100 reflects the deceleration request from the driver in the braking force during execution of the roll back suppression control. It is thus possible to efficiently stop the vehicle 1.

The stop-state maintaining control, which is control for maintaining a stop state of the vehicle 1, is executed after the vehicle 1 stops. For example, the control device 100 automatically sets the gear position to "P (Parking)". As another example, the control device 100 automatically puts the parking brake on. As still another example, the control device 100 executes brake hold control (i.e. maintaining a wheel cylinder oil pressure). The stop-state maintaining control may be a combination of some of the above examples.

In the autonomous driving control and the ACC, the control device 100 automatically controls travel of the vehicle 1 based on the driving environment detected by the environment sensor 130. For example, the control device 100 detects a preceding vehicle as a target based on the measurement information obtained by the camera or the LIDAR. Then, the control device 100 automatically adjusts the speed of the vehicle 1 by appropriately controlling the driving force and the braking force. Moreover, the control device 100 automatically makes the vehicle 1 start and stop moving.

It can be said that the control device 100, the driving operation sensor 110, the vehicle state sensor 120, the environment sensor 130, the driving device 150, and the braking device 160 constitute the "driving support control device 50" shown in FIG. 2.

3. Flow of Driving Support Control

Figure 5:
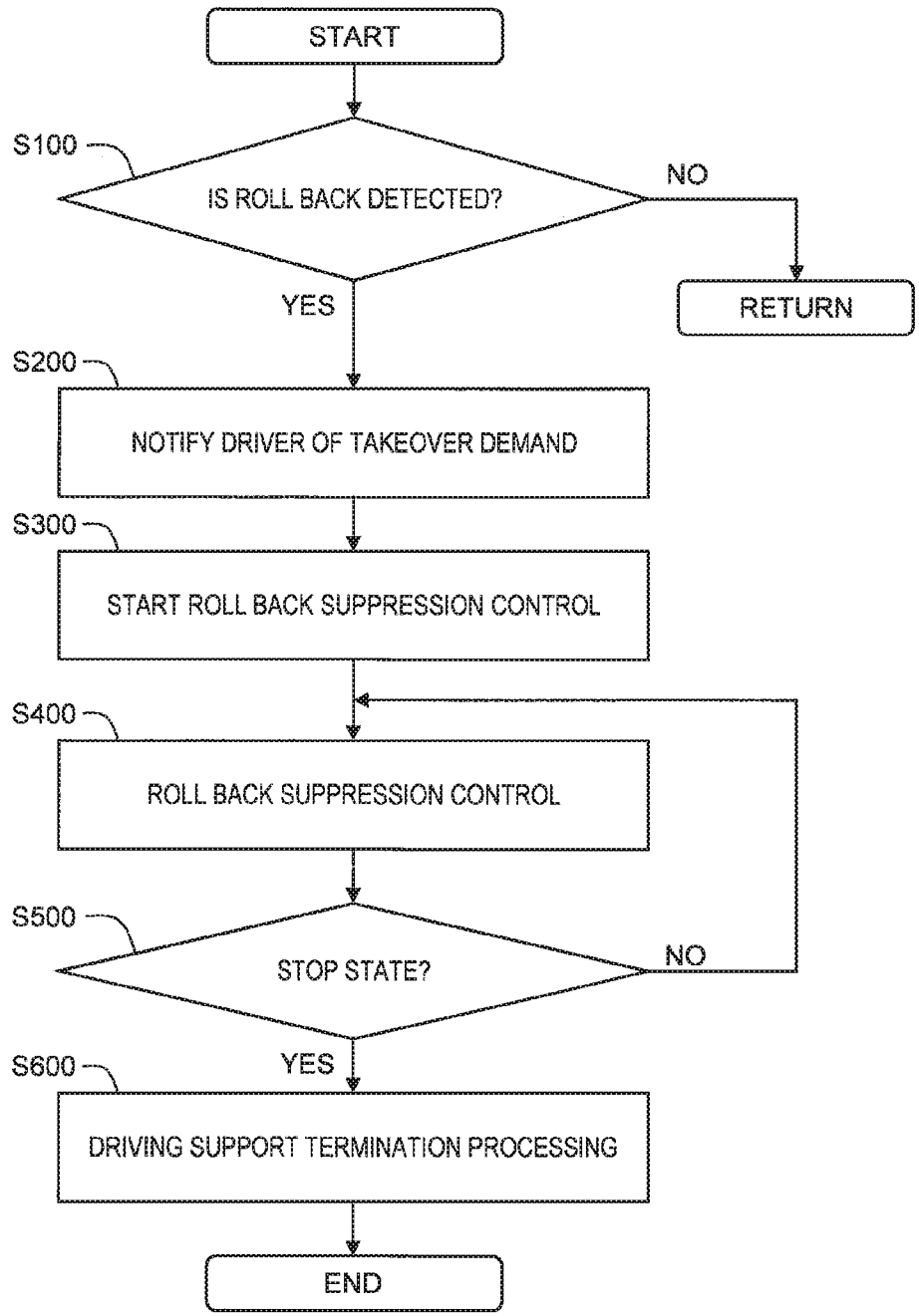
FIG. 5 is a flow chart showing an example of driving support control by the driving support system according to the embodiment of the present disclosure.

FIG. 5 is a flow chart showing an example of the driving support control by the driving support system 10 according to the present embodiment. The flow shown in FIG. 5 is repeatedly executed every certain cycle. It should be noted that the driving support function is ON and the autonomous driving control or the ACC is in execution at a start of the flow shown in FIG. 5.

In Step S100, the roll back detection device 20 determines whether or not the roll back of the vehicle 1 occurs. When the roll back detection device 20 detects the roll back (Step S100; Yes), the processing proceeds to Step S200. Otherwise (Step S100; No), the processing in the current cycle ends.

In Step S200, the control device 100 notifies the driver of a takeover demand through the HMI unit 140. The control device 100 may further notifies the driver of a fact that the vehicle 1 is in a roll back state. The control device 100 may urge the driver to push the brake pedal.

In Step S300, the driving support control device 50 starts the roll back suppression control.

In Step S400, the driving support control device 50 executes the roll back suppression control. More specifically, the driving support control device 50 calculates at least one of the system's request driving force FD1 and the system's request braking force FB1 required for stopping the vehicle 1. Then, the driving support control device 50 generates the required driving force and/or braking force by appropriately controlling the driving device 150 and/or braking device 160.

The driving support control device 50 generates only the system's request driving force FD1 and refrains from generating the driver's request driving force FD2, even if there is the acceleration request from the driver during execution of the roll back suppression control. It is thus possible to prevent the vehicle 1 from suddenly accelerating due to the driver's request driving force FD2. On the other hand, when there is the deceleration request from the driver, the driving support control device 50 generates a sum of the system's request braking force FB1 and the driver's request braking force FB2 as the braking force. It is thus possible to efficiently stop the vehicle 1.

In Step S500, the stop-state detection device 30 determines whether or not the vehicle 1 is in a stop-state. When the vehicle 1 does not yet stop (Step S500; No), the processing returns back to Step S400. When the vehicle 1 is in the stop-state (Step S500; Yes), the processing proceeds to Step S600.

In Step S600, the driving support control device 50 executes driving support termination processing. In the driving support termination processing, the driving support control device 50 terminates the driving support control in sequence. Terminating the driving support control after the stopping of the vehicle 1 is confirmed in the above-mentioned Step S500 makes it possible to safely execute transition of driving authority to the driver.

Figure 6:
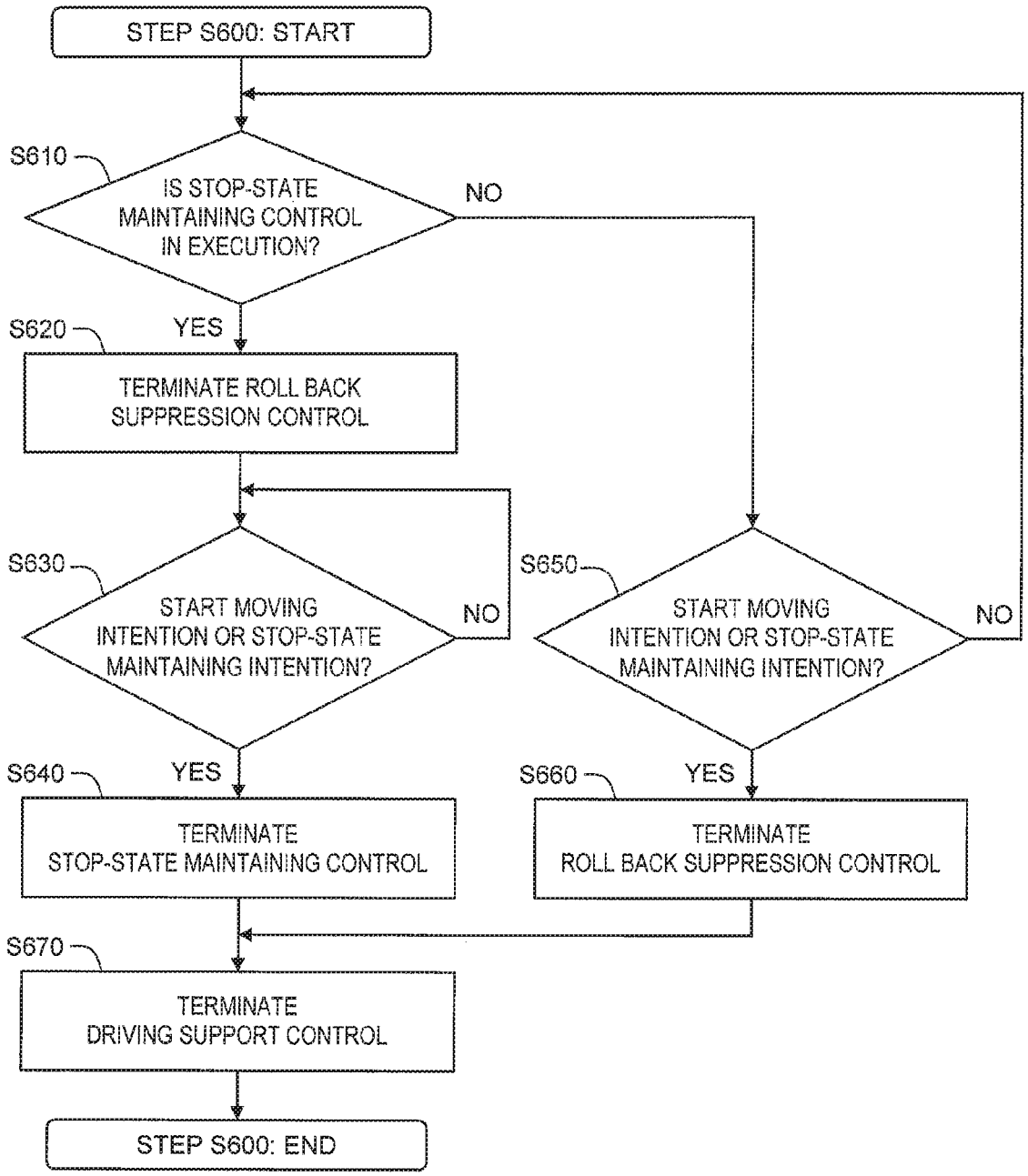
FIG. 6 is a flow chart showing an example of Step S600 (driving support termination processing) in FIG. 5.

FIG. 6 is a flow chart showing an example of Step S600 (the driving support termination processing). In Step S610, the driving support control device 50 determines whether or not the stop-state maintaining control is in execution. When the stop-state maintaining control is in execution (Step S610; Yes), the processing proceeds to Step S620. Otherwise (Step S610; No), the processing proceeds to Step S650.

In Step S620, the driving support control device 50 terminates the roll back suppression control. That is, when starting the stop-state maintaining control after the vehicle 1 stops, the driving support control device 50 terminates the roll back suppression control. After that, the processing proceeds to Step S630.

In Step S630, the driving support control device 50 determines whether or not the driver has a "start moving intention" or a "stop-state maintaining intention".

The start moving intention is the driver's intention of making the vehicle 1 start moving. The driving support control device 50 can determine whether or not the driver has the start moving intention based on a state of the driving operation detected by the driving operation detection device 40. For example, when the acceleration operation by the driver continues for a certain period of time, the driving support control device 50 determines that the driver has the start moving intention. It should be noted that when the acceleration operation by the driver is started before the vehicle 1 stops, the driving support control device 50 counts a duration of the acceleration operation after the stopping of the vehicle 1. The reason is that it is unclear whether the acceleration operation before the stopping of the vehicle 1 is for suppressing the roll back or for making the vehicle 1 start moving.

The stop-state maintaining intention is the driver's intention of maintaining the stop state of the vehicle 1. The driving support control device 50 can determine whether or not the driver has the stop-state maintaining intention based on the state of the driving operation detected by the driving operation detection device 40. For example, when the driver sets the gear position to "P (Parking)", the driving support control device 50 determines that the driver has the stop-state maintaining intention. As another example, when the driver pulls the parking brake lever, the driving support control device 50 determines that the driver has the stop-state maintaining intention. As still another example, when the driver's request braking force FB2 according to the brake pedal operation is larger than a gradient resistance, the driving support control device 50 determines that the driver has the stop-state maintaining intention.

When it is determined that the driver has the start moving intention or the stop-state maintaining intention (Step S630; Yes), the processing proceeds to Step S640. Otherwise (Step S630; No), the processing returns back to Step S630.

In Step S640, the driving support control device 50 terminates the stop-state maintaining control. That is, when determining that the driver has the start moving intention after the stop-state maintaining control is started, the driving support control device 50 terminates the stop-state maintaining control. It is thus possible to prevent the stop-state maintaining control from interrupting start of the vehicle 1. Moreover, when determining that the driver has the stop-state maintaining intention after the stop-state maintaining control is started, the driving support control device 50 terminates the stop-state maintaining control. As a result, the vehicle 1 is prevented from rolling back when the stop-state maintaining control is terminated. After that, the processing proceeds to Step S670.

In Step S650, the driving support control device 50 determines, based on the state of the driving operation, whether or not the driver has the start moving intention or the stop-state maintaining intention. The processing in Step S650 is similar to that in the above-described Step S630. When it is determined that the driver has the start moving intention or the stop-state maintaining intention (Step S650; Yes), the processing proceeds to Step S660. Otherwise (Step S650; No), the processing returns back to Step S650.

In Step S660, the driving support control device 50 terminates the roll back suppression control. That is, when determining that the driver has the start moving intention after the vehicle 1 stops by the roll back suppression control, the driving support control device 50 terminates the roll back suppression control. It is thus possible to prevent the roll back suppression control from interrupting start of the vehicle 1. Moreover, when determining that the driver has the stop-state maintaining intention after the vehicle 1 stops by the roll back suppression control, the driving support control device 50 terminates the roll back suppression control. As a result, the vehicle 1 is prevented from rolling back when the roll back suppression control is terminated. After that, the processing proceeds to Step S670.

In Step S670, the driving support control device 50 terminates the driving support control. Terminating the driving support control in sequence in consideration of the start moving intention and the stop-state maintaining intention of the driver as shown in FIG. 6 makes it possible to safely execute transition of driving authority to the driver.

4. Examples of Roll Back Suppression Control 4-1. First Example

Figure 7:
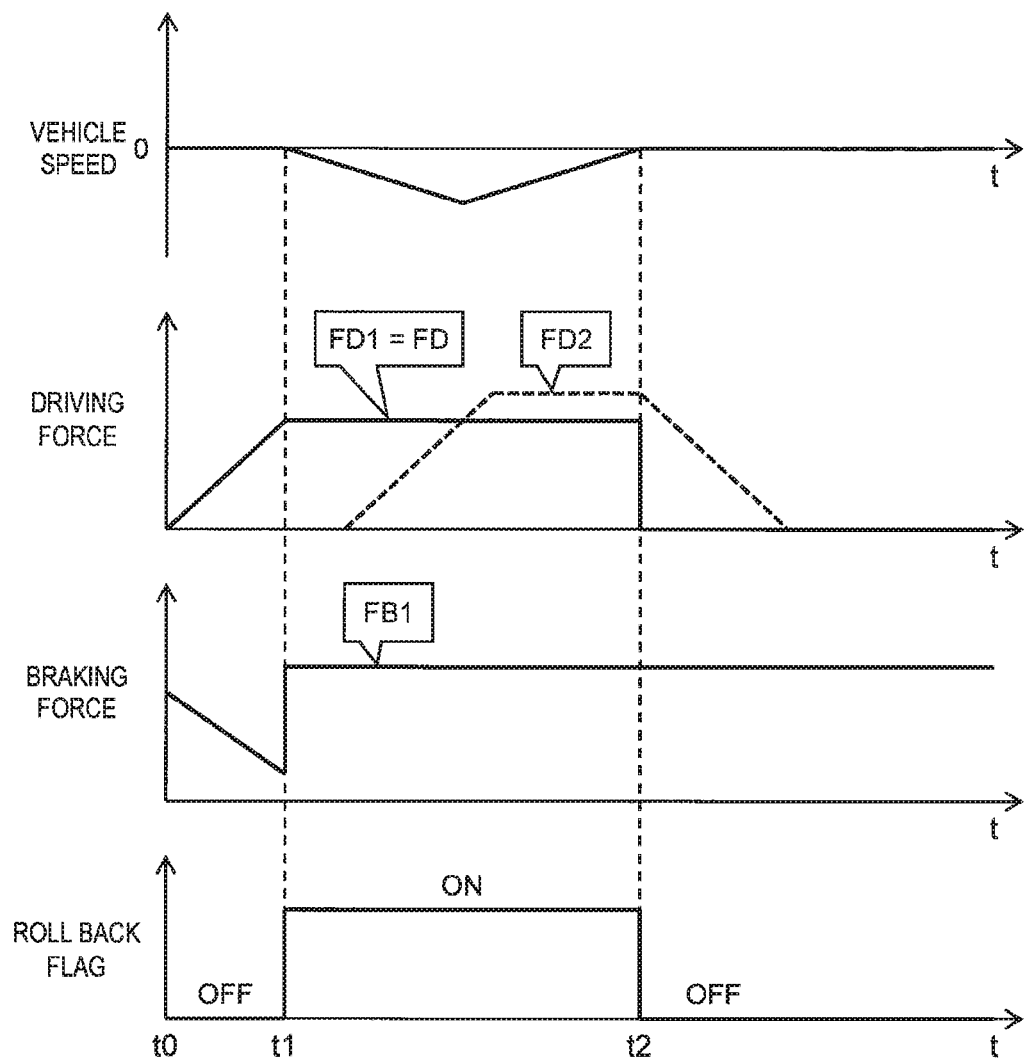
FIG. 7 is a timing chart showing a first example of roll back suppression control by the driving support system according to the present disclosure.

FIG. 7 is a timing chart showing a first example of the roll back suppression control according to the present embodiment. The first example represents the roll back suppression control in a situation where the vehicle 1 automatically starts moving.

In a period from time t0 to t1, the driving force FD increases and the braking force FB decreases in order to make the vehicle 1 automatically start moving. At the time t1, the roll back is detected and thus the roll back suppression control is started. In the roll back suppression control, the system's request driving force FD1 and the system's request braking force FB1 for stopping the vehicle 1 are generated. The driving force FD during execution of the roll back suppression control is the system's request driving force FD1, and the driver's request driving force FD2 is not reflected in the driving force FD.

The roll back suppression control continues at least until the vehicle 1 stops. At a time t2, the vehicle 1 stops. Then, the driving force FD decreases to zero and the braking force FB is maintained at the system's request braking force FB1. As a result, the vehicle 1 continues to stop.

4-2. Second Example

Figure 8:
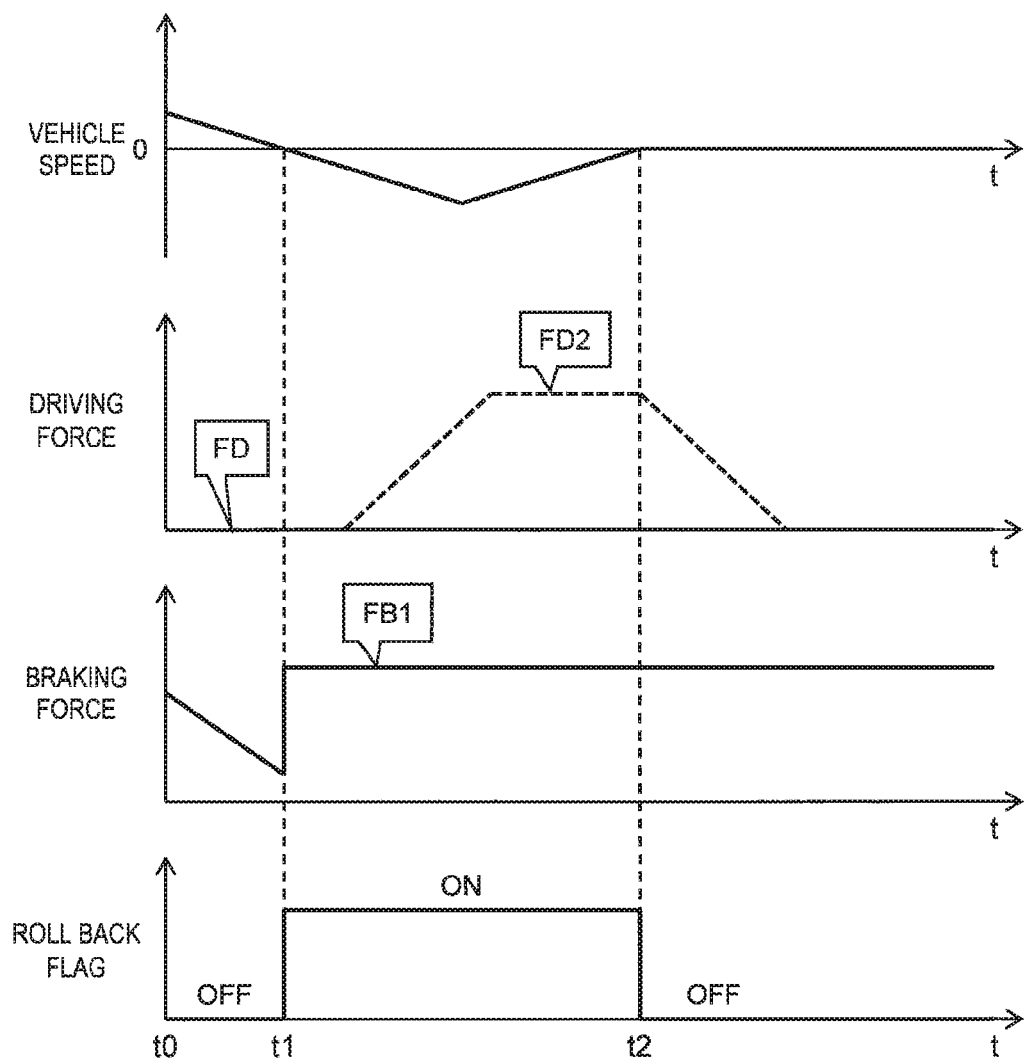
FIG. 8 is a timing chart showing a second example of roll back suppression control by the driving support system according to the present disclosure.

FIG. 8 is a timing chart showing a second example of the roll back suppression control according to the present embodiment. The second example represents the roll back suppression control in a situation where the vehicle 1 automatically stops.

In a period from time t0 to t1, the driving force FD is zero and the braking force FB gradually decreases. At the time t1, the roll back is detected and thus the roll back suppression control is started. In the roll back suppression control, the system's request braking force FB1 for stopping the vehicle 1 is generated. When the driving force FD is zero immediately before the roll back detection, the driving force FD is not used in the roll back suppression control. The others are the same as in the case of the first example described above.

4-3. Third Example

Figure 9:
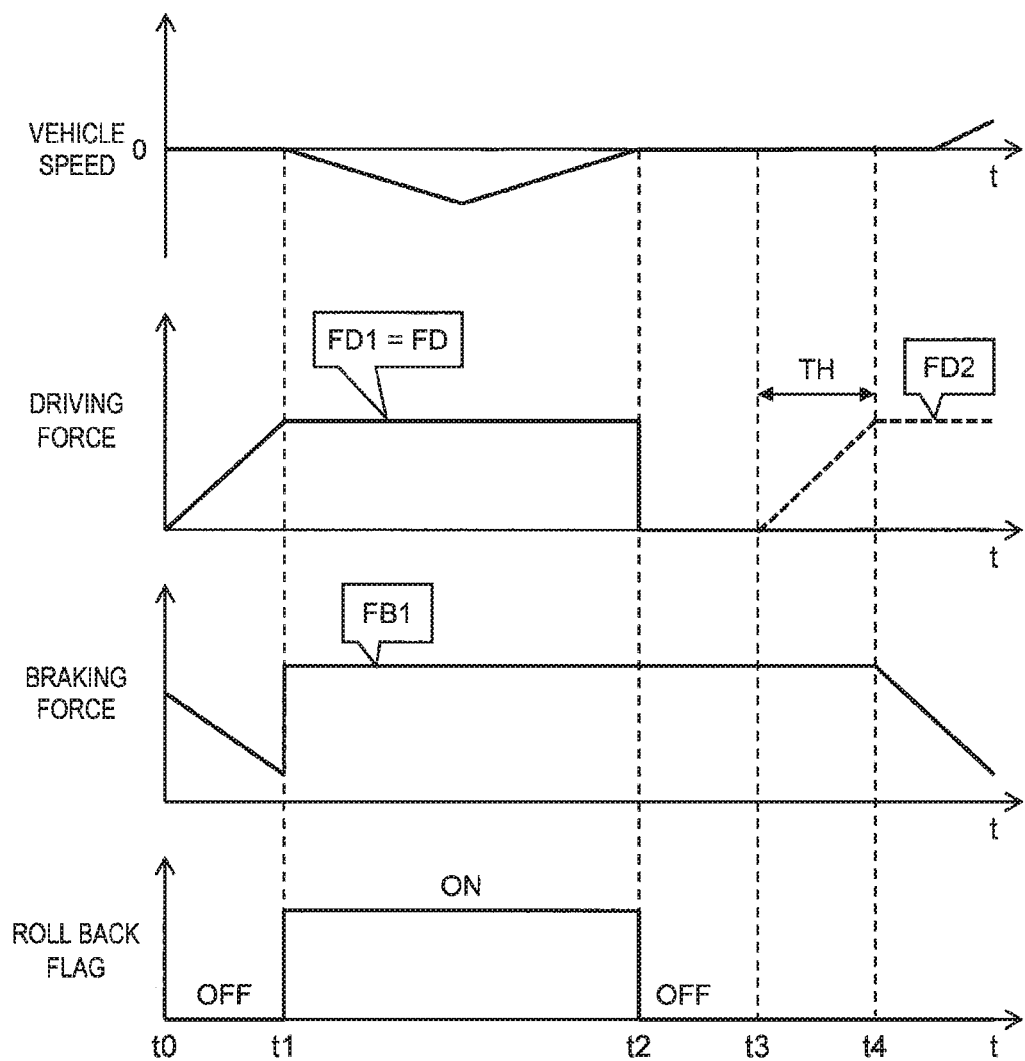
FIG. 9 is a timing chart showing a third example of roll back suppression control by the driving support system according to the present disclosure.

FIG. 9 is a timing chart showing a third example of the roll back suppression control according to the present embodiment. The situation until the time t2 when the vehicle 1 stops is the same as in the case of the first example described above.

At a time t3 after the time t2, the driver starts the acceleration operation and thus the driver's request driving force FD2 is generated. When the acceleration operation continues for a certain period of time TH, the driving support control device 50 determines that the driver has the start moving intention. Therefore, the driving support control device 50 gradually decreases the braking force FB from a time t4 after an elapse of the certain period of time TH from the time t3. After that, the vehicle 1 starts moving. The driving support control device 50 terminates the driving support control.

4-4. Fourth Example

Figure 10:
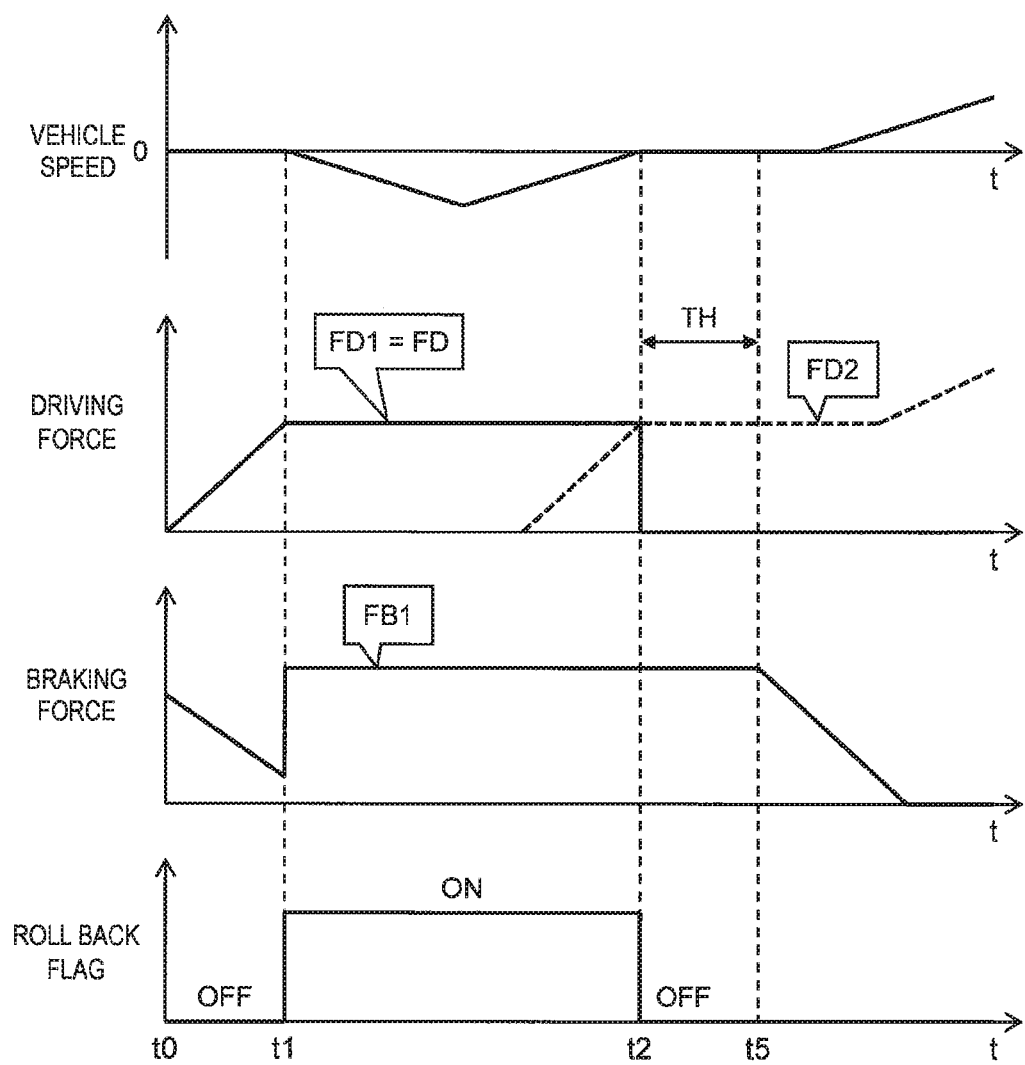
FIG. 10 is a timing chart showing a fourth example of roll back suppression control by the driving support system according to the present disclosure.

FIG. 10 is a timing chart showing a fourth example of the roll back suppression control according to the present embodiment. In the fourth example, the driver starts the acceleration operation and the driver's request driving force FD2 is generated before the time t2 when the vehicle 1 stops. However, it is unclear whether the acceleration operation before the stopping of the vehicle 1 is for suppressing the roll back or for making the vehicle 1 start moving. Therefore, the driving support control device 50 counts a duration of the acceleration operation after the stopping of the vehicle 1.

When the acceleration operation continues for a certain period of time TH, the driving support control device 50 determines that the driver has the start moving intention. Therefore, the driving support control device 50 gradually decreases the braking force FB from a time t5 after an elapse of the certain period of time TH from the time t2. After that, the vehicle 1 starts moving. The driving support control device 50 terminates the driving support control.

What is claimed is:

1. A driving support system installed on a vehicle and comprising:
   a roll back detection device configured to detect roll back of the vehicle, wherein the roll back of the vehicle is a vehicle movement in a direction opposite to a desired movement direction;
   a stop-state detection device configured to detect stopping of the vehicle;
   a driving operation detection device configured to detect a driving operation performed by a driver of the vehicle; and
   a driving support control device configured to execute driving support control,
   wherein, upon detection of the roll back, the driving support control includes roll back suppression control that generates at least one of a driving force and a braking force to stop the vehicle,
   wherein the driving support control device is configured to continue the roll back suppression control at least until the vehicle stops, even when the driving operation is performed by the driver during execution of the roll back suppression control.

2. The driving support system according to claim 1,
   wherein the driving support control device is further configured to determine, based on a state of the driving operation, whether or not the driver has a stop-state maintaining intention of maintaining a stop state of the vehicle,
   wherein when determining that the driver has the stop-state maintaining intention after the vehicle stops by the roll back suppression control, the driving support control device terminates the roll back suppression control.

3. The driving support system according to claim 1,
   wherein the driving support control device is further configured to determine, based on a state of the driving operation, whether or not the driver has a start moving intention of making the vehicle start moving,
   wherein when determining that the driver has the start moving intention after the vehicle stops by the roll back suppression control, the driving support control device terminates the roll back suppression control.

4. The driving support system according to claim 1,
   wherein the driving support control further includes stop-state maintaining control that maintains a stop state of the vehicle,
   wherein when starting the stop-state maintaining control after the vehicle stops by the roll back suppression control, the driving support control device terminates the roll back suppression control.

5. The driving support system according to claim 4,
   wherein the driving support control device is further configured to determine, based on a state of the driving operation, whether or not the driver has a stop-state maintaining intention of maintaining a stop state of the vehicle,
   wherein when determining that the driver has the stop-state maintaining intention after the stop-state maintaining control is started, the driving support control device terminates the stop-state maintaining control.

6. The driving support system according to claim 4,
   wherein the driving support control device is further configured to determine, based on a state of the driving operation, whether or not the driver has a start moving intention of making the vehicle start moving,
   wherein when determining that the driver has the start moving intention after the stop-state maintaining control is started, the driving support control device terminates the stop-state maintaining control.

7. The driving support system according to claim 1,
   wherein the driving operation includes an acceleration operation, and
   the driving support control device refrains from generating a driver's request driving force according to the acceleration operation during the roll back suppression control.

8. The driving support system according to claim 1,
   wherein the roll back is in the direction opposite to the desired movement direction expected from a gear position.

9. The driving support system according to claim 1,
   wherein the roll back suppression control generates at least the driving force to stop the vehicle when the roll back is detected.

* * * * *